United States Patent [19]

McCabe

[11] Patent Number: 5,297,164
[45] Date of Patent: Mar. 22, 1994

[54] DIGITAL COMMUNICATIONS SYSTEMS

[75] Inventor: David J. McCabe, Winchester, England

[73] Assignee: Shaye Communications, Limited, Hampshire, England

[21] Appl. No.: 833,446

[22] Filed: Feb. 7, 1992

[30] Foreign Application Priority Data

Feb. 12, 1991 [GB] United Kingdom ............... 9102936

[51] Int. Cl.$^5$ ............................................. H04B 3/46
[52] U.S. Cl. .................................... 375/10; 375/99
[58] Field of Search ............. 375/10, 94, 95, 97, 375/99, 106; 371/31, 61, 62; 455/296

[56] References Cited

U.S. PATENT DOCUMENTS

| | | | |
|---|---|---|---|
| 3,968,328 | 7/1976 | Tsuchiya et al. | 375/98 |
| 4,074,358 | 2/1978 | Caputo et al. | 365/514 |
| 4,318,128 | 3/1982 | Sauvanet | 375/76 |
| 4,535,461 | 8/1985 | Stepp et al. | 375/110 |
| 4,768,208 | 8/1988 | Cornett | 375/95 |
| 5,073,905 | 12/1991 | Dapper et al. | 375/106 |
| 5,172,395 | 12/1992 | Dapper et al. | 375/10 |

*Primary Examiner*—Stephen Chin
*Attorney, Agent, or Firm*—Wenderoth, Lind & Ponack

[57] ABSTRACT

Corruption in digital data communications systems is detected, at the receiving end, by taking a number of samples of the received signal within each bit period. Flip flops (4, 7 and 8) are used to take samples from the digitized received signal as follows: flip flop (4), a mid bit sample indicative of the value of the center of the bit; flip flop (7), a pre-mid sample taken within the bit period before the mid-bit sample; and flip flop (8), a post-mid sample taken within the bit period after the mid-bit sample. Gating circuitry (23, 24, 25) is used to analyse the three samples and give a "good" or "bad" output signal to register 11 as a result of the analysis. Corruption is judged to be present if any one of the samples has a different value to the others.

12 Claims, 2 Drawing Sheets

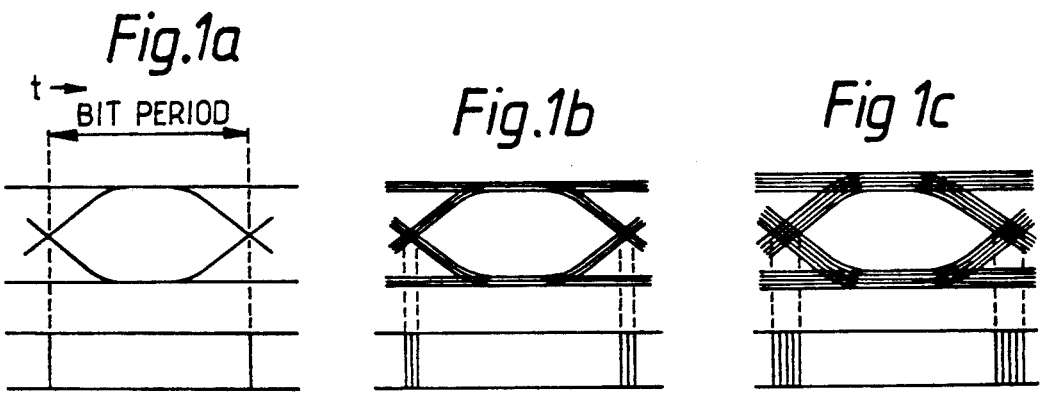
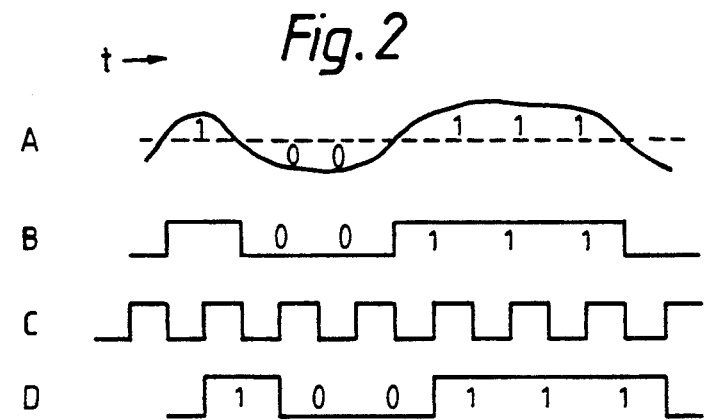
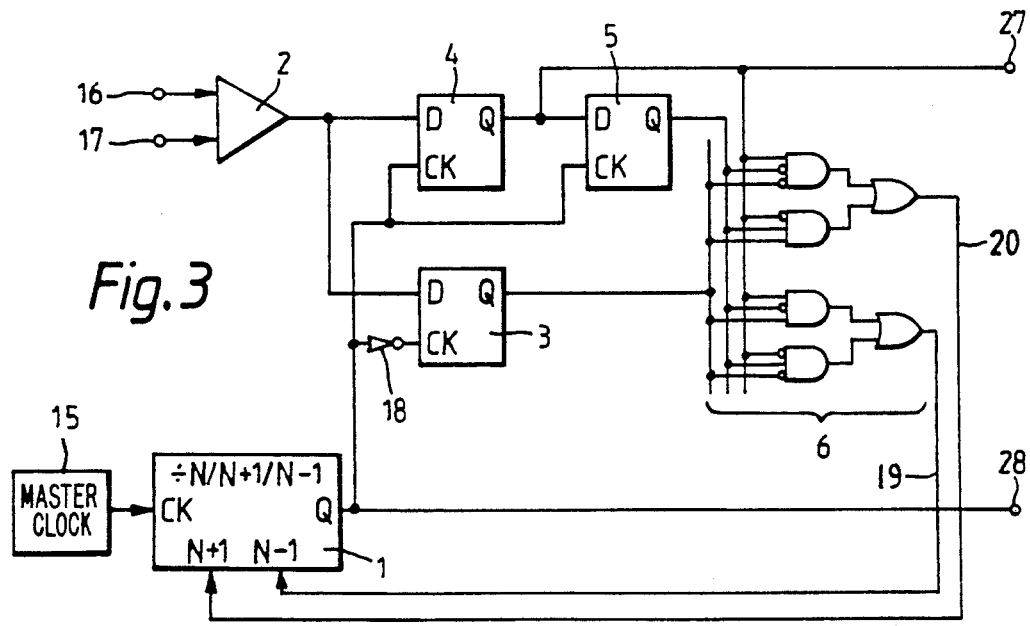

DIGITAL COMMUNICATIONS SYSTEMS

BACKGROUND OF THE INVENTION

1. Field of the Invention

This invention relates to digital communication systems and in particular to a method and apparatus for detecting data corruption in such systems. The invention finds particular, though not exclusive, application in the field of cordless telephony, in particular the new CT2 digital systems.

2. Description of the Related Art

In such CT2 digital systems, imperfections in the transmission system may cause the data to be corrupted, e.g. due to interference or fading on an RF link. In many such applications, it is possible to transmit extra information to permit error detection and/or correction at the receiving end. Such methods include parity checks, cyclic redundancy codes, etc. In other applications however, the increase in data rate or transmission time which is needed in order to append such information is not practical.

The present invention relates to such situations and provides a method and apparatus for error rate detection in digital communication systems, particularly those having limited bandwidth. The invention permits monitoring of data integrity without requiring any extra data to be transmitted. It has the advantage that the onset of corruption of the data can often be anticipated, i.e. detection of link degradation extends into the region where data can still be correctly recovered, as well as situations where the data is actually corrupted.

The specific application in which the invention is intended to be used is in the transmission of digitized speech over an RF link in a CT2 digital cordless telephone system. Here, not enough bandwidth is available to add error detection/correction data to the speech data. Therefore, it is necessary to detect poor reception conditions due to low signal strength or interference in order to prevent the user being subjected to the loud noises that the speech decoder generates in the presence of significant bit error rates.

Monitoring of the received RF signal strength is commonly used to predict the onset of corruption in radio applications; however, this technique cannot detect corruption by an interfering signal as the signal strength of the principal signal may well remain high. Also, the correlation between signal strength and data degradation varies between RF units so such predictions may be inaccurate.

When noise or interference is added to a bandlimited data stream, two effects occur. Firstly the recovered value of the bit may be corrupted. This corruption is usually not detectable if no error detection data is sent—the transmitted data could have any value. Secondly the time of the transitions between bit values will be altered from their normal position (jitter). The invention detects such jitter and uses it as an indication of (possible) bit corruption.

Already known is a synchronizing circuit which takes a number of samples of an incoming signal per bit and uses some function of the values of these samples (e.g. a majority vote) to determine the correct value of the received data bit. Methods of automatically gaining synchronism using the value of the samples are also known.

The technique of the present invention involves taking a number of samples per incoming bit, and also using some function of the values of these samples to determine whether the jitter present exceeds one or more thresholds. We may then either give a single indication of the presence and/or degree of such jitter, or periodically give an indication of the number and/or degree of such occurrences. These indications are used to assess the quality of the communications link and detect degradation, enabling some corrective or preventative action to be taken.

SUMMARY OF THE INVENTION

In accordance with a first aspect of the invention there is provided a method of detecting data corruption in digital communications systems, said method comprising taking samples of the received signal and utilizing some function of the value of such samples to determine whether excessive jitter is occurring, the existence or otherwise of such jitter being used as an indication of possible data corruption, said method being characterized in that, for each bit of the received signal, two samples are taken as follows: 1) a mid-bit sample indicating the value at the approximate mid position of the bit; and 2) a further sample taken within the bit period either before or after the mid-bit sample; said method further comprising comparing the value of said further sample with the mid-bit sample to determine whether jitter is present.

In accordance with a second aspect of the invention there is provided apparatus for detecting data corruption in digital communications systems, said apparatus comprising, at the receiving end of such system, means for taking samples of the received signal and utilizing some function of the value of such samples to determine whether excessive jitter is occurring, the existence or otherwise of such jitter being used as an indication of possible data corruption, said apparatus being characterized in that said sample taking means includes first means for taking a mid-bit sample indicating the value at the approximate mid position of the bit and second means for taking a further sample within the bit period at a time either before or after the mid bit sample and being further characterized by means for comparing the value of said further sample with the mid bit sample to determine whether jitter is present.

The samples that are taken are those of the received analog waveform which has been sliced to produce a digital waveform comprising a series of 0's and 1's representative of the received analog waveform. This is explained in more detail below. The length of each bit is called the bit period, and both the samples are taken within this period; however, for synchronization purposes, it is desirable to take a transition sample at the end of each bit, whose value will be representative of the value of the signal at the nominal transition time from one bit to the next. This transition sample can be used, in conjunction with, for example, the mid bit sample in order to synchronise a clock with the received signal which provides a clock signal operable to control the sample taking means.

Although just a single further bit can be used, in the preferred embodiment of the invention, two further samples are taken within each bit: a pre-mid sample prior to the mid bit sample, and a post-mid sample following the mid bit sample. In order to detect data corruption the value of these three samples (pre-mid, mid and post-mid) are compared, and if the value of one is different to that of the other two, then corruption is judged to be present.

It is also possible to take more than two further samples. Although not essential, the logical arrangement would be to take equal numbers of such further samples on each side of the center bit, for example 3 pre-mid samples and three post-mid samples giving six further samples in all. All of the further samples are spaced from one another and are arranged within the bit to detect different degrees of degradation of the bit: for example, if a pre-mid sample close to the mid bit sample has a different value, this would be taken as an indication of more severe degradation of the bit than a change in value of a pre-mid sample further away from the mid bit sample. Thus by logical analysis of the further samples an indication of increasing (or decreasing) bit degradation can be obtained.

In order that the invention may be better understood, reference is now made to the accompanying drawings in which:

BRIEF DESCRIPTION OF THE DRAWINGS

FIG. 1a–1c are a series of three drawings showing (above) a typical received analog data signal and (below) its equivalent after slicing, showing the effect of increasing noise;

FIG. 2 is a series of waveform diagrams showing the input and output waveforms of a typical known synchronizing circuit;

FIG. 3 is a block diagram of a typical circuit for implementing the known synchronizing technique;

DESCRIPTION OF THE PREFERRED EMBODIMENT

Figure 4:
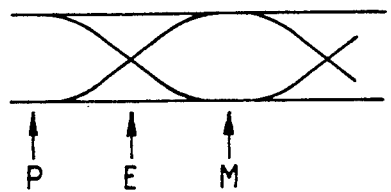
FIG. 4 is a waveform diagram of the input analog waveform, showing the sample positions used to implement the known synchronizing technique.

The top of FIG. 1a shows a bandlimited data signal as it might appear on an oscilloscope synchronized to the transmitter and showing one bit period. All the possible bit states and transitions are superimposed, generating the so-called "eye" pattern. Comparing this against its mean level gives the digital "sliced" signal shown below. FIG. 1a shows the situation where substantially no noise is present; FIGS. 1b and 1c are corresponding drawings, showing the effect of adding progressively more noise. It will be seen that the comparison threshold is crossed at slightly different times on each bit because of the different instantaneous noise voltage, leading to jitter in the sliced data. The transition regions encroach into the bit as the amount of noise is increased. In the invention, the jitter is detected by taking samples of the sliced data near the transition time, and comparing these with the value at the center of the bit. If these samples differ then jitter is judged to be present.

Circuitry necessary to realize the invention will be described, by way of example, as an extension to the synchronizing circuit required at the receiving end of a data link. FIG. 2 shows the input and output signals of such a system. The incoming analog signal (A) is compared against its mean level to generate a sliced digital signal (B). The synchronizing circuit generates from this signal:

a) a recovered clock signal (C) which has one cycle for each incoming bit, and whose transitions track the average position of those of the incoming data;

b) a retimed data signal (D), which contains the same bit stream as the incoming data, but whose transitions are synchronized to the recovered clock.

There is necessarily some delay between the input data (B) and retimed data (D), as shown in the figure. The recovered clock and retimed data signals (C) and (D) are passed to the rest of the data receiving system, which is dependent on the application.

A known synchronizing technique involves taking two samples of the received data during each bit, one at the center and one at the nominal time of the transition. The sample at the center gives the value of the bit and is used to create the retimed data signal. The sample at the transition, in conjunction with the following and preceding mid-bit samples, can be used to determine whether the transition is early or late with respect to its nominal time. To make the recovered clock signal track the data transitions, early and late events are made to control the generation of the recovered clock. Such a system can adjust itself to give the correct relationship between the input data and the recovered clock signal even if not initially correctly synchronized.

FIG. 3 shows a typical circuit for implementing the known technique. A divider 1 generates the recovered clock signal at output Q by dividing down the output from a higher frequency master clock 15 by (nominally) N. The input signal in the form of bandlimited data is applied at input terminal 16 and is passed as one input to a comparator 2. The other input to the comparator 2 is taken from a threshold level applied at terminal 17. The comparator acts as a slicing circuit for the analog input data, and produces a digital data signal such as shown in FIG. 2B. The output of the comparator 2 is applied to the D input of a flip flop 4. The recovered clock signal is applied to the clock input CK of the flip flop. The flip flop 4 takes a sample of the comparator output on the positive edge of the recovered clock signal. When synchronized, this occurs at the center of the incoming bit (see FIG. 2). This sample is output from flip flop 4 and forms the retimed data signal.

The Q output from flip flop 4 is connected to the D input of a further flip flop 5 so that flip flops 4 and 5 together form a shift register, such that flip flop 4 holds the value of the data at the middle of the present bit, and flip flop 5 that of the previous bit. The output of comparator 2 is also applied to the D input of a flip flop 3. The flip flop 3 is fed with a clock signal which is inverted in inverter 18. Thus, flip flop 3 takes a sample of the comparator output on the negative edge of the recovered clock signal, corresponding to the end of the data bit of the incoming data signal (i.e. the nominal transition time). Thus the outputs from flip flops 3, 4 and 5 represent end-of-bit, mid-bit and previous mid-bit samples respectively. The signals formed by these samples are passed to respective inputs of gating circuitry 6. The gating 6 generates respective signals on lines 19 and 20 representative of early and late indications from the three data samples, and these two signals control divider 1. The early and late signals are made to alter the division ratio of this counter. These signals are passed, as shown, to the N−1 (early) and N+1 (late) control inputs of the divider 1 to control the modulus of the counter. Thus if a late transition occurs, the counter divides by N+1 for one cycle. This causes the next edge of the recovered clock to be delayed with respect to its normal time, thus tracking the incoming data. The opposite action takes place after an early transition; the counter divides by N−1 and its output edge is advanced. FIG. 4 shows the position of the three samples with respect to the input analog data signal. The three samples are represented as M for mid, E for end and P for previous mid.

Figure 6:
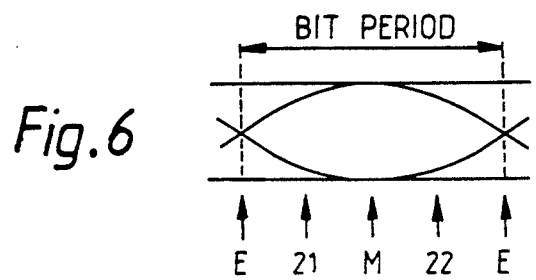
FIG. 6 is a diagram similar to FIG. 4, but showing the sample positions used in the error detection system of the present invention.

In the present invention, at least one extra sample is taken during each bit period. In the example illustrated in FIG. 6, two extra samples, pre-mid (reference 21) and post-mid (reference 22), are taken during each bit period. These extra samples are positioned in time before and after the mid-bit sample and are, in the example illustrated, equally spaced in time from it. Choice of the spacing is discussed later. The value of these two samples is used together with the value of the mid-bit sample to assess the integrity of the bit. If the value of one sample is different to that of the other two then it is assumed that it is due to jitter and causes an indication of link degradation. The degree of jitter, or the frequency of occurrence of such indications may be used as an assessment of the quality of the data link.

As has been mentioned, as the degradation by noise increases, the transition region spreads out gradually from the end of the bit towards the center (FIG. 1). It is clear that by suitable choice of the separation of the two new samples, jitter can be detected before the value of the bit (which is determined by the center bit sample) is adversely affected. The sample positions must however be sufficiently distant from the transition time that systematic jitter, caused by the synchronization circuit or other effects inherent in the transmission system, does not cause spurious indications.

In the case of an interfering signal, it cannot generally be guaranteed that detection of jitter will occur before corruption of the bit, but it will usually be detected as the transition times will usually be disturbed.

Figure 5:
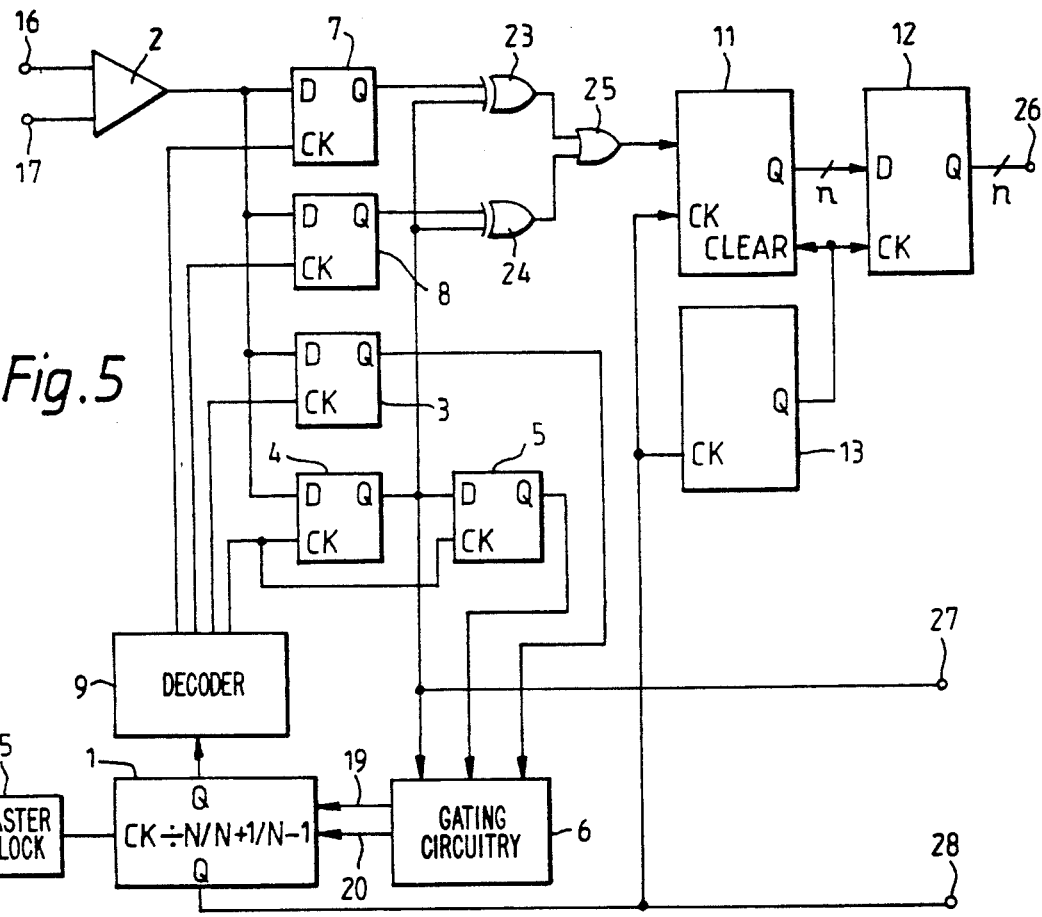
FIG. 5 is a diagram similar to FIG. 3, but showing the error detection system of the present invention.

FIG. 5 is an exemplary circuit for implementing this technique. Much of the circuitry is similar to that of FIG. 3, and will not be described again. As before, the incoming analog signal is sliced by comparator 2. Four samples of the comparator output are taken by D-type flip-flops 3, 4, 7 and 8 during each bit period, at times determined by divider 1 and a decoder 9. Divider 1 times the bit period to be equal to N cycles of the higher frequency master clock 15. The decoder 9, which is new, selects the four count values at which samples are to be taken, corresponding to their appropriate times within each data bit.

The end of bit sample, the mid bit sample, together with the mid bit sample from the previous bit which is held by flip flop 5 are input to a synchronization circuit containing gating circuitry 6 operable to generate "early" and "late" signals for altering the modulus of divider 1 to achieve synchronization, as in FIG. 3.

The pre-mid sample 21 is generated at the Q output of flip flop 7 and is passed to one input of an exclusive-OR gate 23. The post-mid sample 22 is generated at the Q output of flip flop 8 and is passed to one input of an exclusive-OR gate 24. The other input of each of gates 23 and 24 receive the mid-bit sample output from flip flop 4. The outputs of gates 23 and 24 are passed to the respective inputs of an OR gate 25.

It will be seen that there are various possible inputs for gates 23 and 24. Four examples will serve to illustrate the operation:

1) Mid, post-mid and pre-mid samples all logic 0:
   Output from gates 23,24 = logic 0
   Output from gate 25 = logic 0
2) Mid, post-mid and pre-mid samples all logic 1:
   Output from gates 23,24 = logic 0
   Output from gate 25 = logic 0
3) Mid sample is logic 1, post-mid and pre-mid samples both logic 0:
   Output from gates 23,24 = 1
   Output from gate 25 = 1
4) Mid and post-mid samples both logic 1, pre-mid sample is logic 0:
   Output from gate 23 = 1
   Output from gate 24 = 0
   Output from gate 25 = 1

Whether the inputs to gates 23 and 24 is at logic 0 or logic 1 will, of course, be determined by the amplitude of the sample concerned; thus, if the sample is not present at all, or has a level which is below a predetermined threshold, then this will be regarded as logic 0; likewise if the sample is above the threshold level, this will be regarded as logic 1.

On this basis, examples 3 and 4 above are regarded as providing an indication of jitter because one of the samples is different to the other two. The gating 23-25 detects these differences and outputs a logic 1 only if jitter is judged to be present. In this event, a bad transition counter 11, which receives the output of gate 25, is incremented at the end of the bit.

The counter 11 is clocked by the recovered clock signal and is cleared for a fresh count by a signal from the Q output of a further counter 13. Counter 13 is also clocked by the recovered clock signal and acts to clear the counter 11 after a predetermined number of clock bits have been counted. Thus, after this predetermined number of bits, the count held in counter 11 (which represents the number of bad transitions during that period) is latched into a register 12, connected to the Q output of counter 11, and counter 11 is cleared ready for another measurement. The output value of register 12 is then available at terminal 26 as a "bad transition count" for examination by a controlling processor (not shown). This cycle is repeated continually. The retimed data signal and the recovered clock signal are available for use by later circuitry (not shown) at terminals 27 and 28 respectively.

In the system shown, the value of the "mid" sample can be used as the value of the received data (as usual). Alternatively, a majority vote of "mid", "pre-mid", and "post-mid" can be used, or a majority vote of "mid" and two other samples at a different spacing from "mid". The manner in which the samples are analyzed can be varied according to the circumstances, and will not be further described.

I claim:

1. A method of detecting data corruption in digital communications systems, said method comprising taking samples of the received signal and utilizing a function of the value of such samples to determine whether excessive jitter is occurring, the existence of such jitter being used as an indication of possible data corruption, said method being characterized in that, for each bit of the received signal, three samples are taken as follows:
    1) a mid-bit sample indicating the value at the approximate mid position of the bit; and 2) two further samples taken within the bit period, one before and one after the mid-bit sample;

said method further comprising comparing the values of all three samples with one another to determine whether jitter is present, and wherein jitter is assumed to be present if the value of one sample is different from that of the other two samples.

2. A method as claimed in claim 1, further comprising taking a transition bit sample of the received signal indicative of the value at the nominal time of transition from one bit to the next.

3. A method as claimed in claim 2, further comprising generating a clock signal synchronized with the incoming data signal for defining the bit period.

4. A method as claimed in claim 3, wherein synchronization of said clock signal is achieved by a comparison of said transition bit sample with the mid-bit sample from the current bit, and the preceding bit.

5. An apparatus for detecting data corruption in digital communications systems, said apparatus comprising, at the receiving end of such system, a means for taking samples of the received signal and utilizing a function of the value of such samples to determine whether excessive jitter is occurring, the existence of such jitter being used as an indication of possible data corruption, said apparatus being characterized in the sample taking means includes first means for taking a mid-bit sample indicating the value at the approximate mid position of the bit, a second means for taking a further sample within the bit period at a time before the mid bit sample, and a third means for taking a still further sample within the bit period at a time after the mid bit sample and a means for comparing the values of all three samples with one another to determine whether jitter is present, wherein jitter is assumed to be present if the value of one sample is different from that of the other two samples.

6. An apparatus as claimed in claim 5, further comprising a clock means operable to control the times at which aid samples are taken.

7. An apparatus as claimed in claim 6, further comprising a synchronizing means for synchronizing the clock signal with a received data signal.

8. An apparatus as claimed in either one of claims 6 or 7, wherein said first, second and third means, forming part of said sample taking means, comprise respective gating circuits controlled by said clock signal to take samples at appropriate times.

9. An apparatus as claimed in claim 8, wherein outputs of said gating circuits is applied to further gating circuitry, which further gating circuitry applies a logical operation on the sample signals to determine whether any one of the sample signals is different from the other sample signals.

10. An apparatus as claimed in any one of claims 5 to 7, further comprising slicing circuitry for converting the received analog data signal into a digital signal for application to said sample taking means.

11. An apparatus as claimed in claim 8, further comprising slicing circuitry for converting the received analog data signal into a digital signal for application to said sample taking means.

12. An apparatus as claimed in claim 9, further comprising slicing circuitry for converting the received analog data signal into a digital signal for application to said sample taking means.

* * * * *